United States Patent
Mula et al.

(10) Patent No.: US 11,558,316 B2
(45) Date of Patent: Jan. 17, 2023

(54) ZERO-COPY BUFFERING OF TRAFFIC OF LONG-HAUL LINKS

(71) Applicant: MELLANOX TECHNOLOGIES TLV LTD., Raanana (IL)

(72) Inventors: Liron Mula, Ramat Gan (IL); Idan Matari, Lod (IL); Niv Aibester, Herzliya (IL); George Elias, Tel Aviv (IL); Lion Levi, Yavne (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 0 days.

(21) Appl. No.: 17/175,716

(22) Filed: Feb. 15, 2021

(65) Prior Publication Data

US 2022/0263776 A1 Aug. 18, 2022

(51) Int. Cl.
*H04L 12/861* (2013.01)
*H04L 49/90* (2022.01)
*H04L 47/32* (2022.01)
*H04L 49/9047* (2022.01)

(52) U.S. Cl.
CPC .......... *H04L 49/9063* (2013.01); *H04L 47/32* (2013.01); *H04L 49/9047* (2013.01)

(58) Field of Classification Search
CPC ..... H04L 49/90; H04L 47/115; H04L 47/122; H04L 47/18; H04L 47/283; H04L 47/30; H04L 49/3036; H04L 49/9063; H04L 47/32; H04L 49/9047; H04L 49/9005
See application file for complete search history.

(56) References Cited

U.S. PATENT DOCUMENTS

| | | |
|---|---|---|
| 5,014,265 A | 5/1991 | Hahne et al. |
| 5,235,642 A | 10/1993 | Wobber et al. |
| 5,367,520 A | 11/1994 | Cordell |
| 5,541,912 A | 7/1996 | Choudhury et al. |
| 5,574,885 A | 11/1996 | Denzel et al. |
| 5,790,522 A | 8/1998 | Fichou et al. |

(Continued)

FOREIGN PATENT DOCUMENTS

| | | |
|---|---|---|
| EP | 0706298 A2 | 4/1996 |
| EP | 1698976 A1 | 9/2006 |
| WO | 03024033 A1 | 3/2003 |

OTHER PUBLICATIONS

"Understanding CoS Priority Group and Queue Guaranteed Minimum Bandwidth," Traffic Management User Guide (QFX Series and EX4600 Switches), juniper net, pp. 1-4, Feb. 1, 2021, as downloaded from https://www.uniper.net/documentation/us/en/software/junos/traffic-mgmt-qfx/topics/concept/cos-qfx-series-guaranteed-bandwidth-understanding.html.

(Continued)

*Primary Examiner* — Wutchung Chu
(74) *Attorney, Agent, or Firm* — Kligler & Associates Patent Attorneys Ltd

(57) ABSTRACT

A network device includes multiple ports, multiple buffer slices, a controller, and buffer control circuitry. The multiple ports are configured to communicate packets over a network. The multiple buffer slices are linked respectively to the multiple ports. The controller is configured to allocate a group of two or more of the buffer slices to a selected port among the ports. The buffer control circuitry is configured to buffer the packets, communicated via the selected port, in the group of the buffer slices, using zero-copy buffering.

29 Claims, 2 Drawing Sheets

(56) References Cited

U.S. PATENT DOCUMENTS

| | | | |
|---|---|---|---|
| 5,917,947 A | 6/1999 | Ishida et al. | |
| 6,160,814 A | 12/2000 | Ren et al. | |
| 6,169,748 B1 | 1/2001 | Barbas et al. | |
| 6,219,728 B1 | 4/2001 | Yin | |
| 6,324,165 B1 | 11/2001 | Fan et al. | |
| 6,347,337 B1 | 2/2002 | Shah et al. | |
| 6,456,590 B1 | 11/2002 | Ren et al. | |
| 6,490,248 B1 | 12/2002 | Shimojo | |
| 6,535,963 B1 | 3/2003 | Rivers | |
| 6,539,024 B1 | 3/2003 | Janoska et al. | |
| 6,606,666 B1 | 8/2003 | Bell et al. | |
| 6,633,395 B1 | 10/2003 | Tuchitoi et al. | |
| 6,687,254 B1 | 2/2004 | Ho et al. | |
| 6,771,654 B1 | 8/2004 | Sang et al. | |
| 6,895,015 B1 | 5/2005 | Chiang et al. | |
| 6,922,408 B2 | 7/2005 | Bloch et al. | |
| 6,973,555 B2 | 12/2005 | Fujiwara et al. | |
| 6,993,032 B1 | 1/2006 | Dammann et al. | |
| 7,027,457 B1 | 4/2006 | Chiussi et al. | |
| 7,068,822 B2 | 6/2006 | Scott | |
| 7,088,713 B2 | 8/2006 | Battle et al. | |
| 7,131,125 B2 | 10/2006 | Modelski et al. | |
| 7,136,381 B2 | 11/2006 | Battle et al. | |
| 7,190,667 B2 | 3/2007 | Susnow et al. | |
| 7,324,442 B1 | 1/2008 | Pan et al. | |
| 7,327,749 B1 | 2/2008 | Mott | |
| 7,330,426 B2 | 2/2008 | Berzosa et al. | |
| 7,334,065 B1 | 2/2008 | Rose et al. | |
| 7,529,245 B1* | 5/2009 | Muller | H04L 69/14 370/395.7 |
| 7,590,058 B1 | 9/2009 | Cherchali et al. | |
| 7,609,636 B1 | 10/2009 | Mott | |
| 7,630,306 B2 | 12/2009 | Chuang | |
| 7,680,139 B1* | 3/2010 | Jones | H04L 47/32 370/230.1 |
| 7,747,086 B1 | 6/2010 | Hobbs et al. | |
| 7,773,622 B2 | 8/2010 | Schmidt et al. | |
| 7,853,738 B2 | 12/2010 | Pothireddy et al. | |
| 7,856,026 B1 | 12/2010 | Finan et al. | |
| 7,924,708 B2 | 4/2011 | Spink | |
| 7,936,770 B1 | 5/2011 | Frattura et al. | |
| 8,060,644 B1* | 11/2011 | Michailidis | H04L 47/10 709/228 |
| 8,125,902 B2 | 2/2012 | Rochon et al. | |
| 8,149,710 B2 | 4/2012 | Bergamasco et al. | |
| 8,270,295 B2 | 9/2012 | Kendall et al. | |
| 8,274,971 B2 | 9/2012 | Battle et al. | |
| 8,352,648 B1 | 1/2013 | Puranik | |
| 8,478,811 B2 | 7/2013 | Garg et al. | |
| 8,589,587 B1* | 11/2013 | Michailidis | H04L 69/12 709/227 |
| 8,599,868 B2 | 12/2013 | Sindhu et al. | |
| 8,635,386 B2 | 1/2014 | Takahashi | |
| 8,656,188 B2 | 2/2014 | Goodwill et al. | |
| 8,699,491 B2 | 4/2014 | Koren et al. | |
| 8,738,860 B2 | 5/2014 | Griffin et al. | |
| 8,762,595 B1* | 6/2014 | Muller | G06F 13/385 710/33 |
| 8,923,337 B2 | 12/2014 | Singh | |
| 9,130,885 B1 | 9/2015 | Bukspan et al. | |
| 9,325,641 B2* | 4/2016 | Haramaty | H04L 49/90 |
| 9,563,361 B1* | 2/2017 | Aslot | G06F 3/065 |
| 9,584,429 B2 | 2/2017 | Haramaty et al. | |
| 9,742,702 B1 | 8/2017 | Bukspan et al. | |
| 10,951,549 B2 | 3/2021 | Elias et al. | |
| 2002/0012340 A1 | 1/2002 | Kalkunte et al. | |
| 2002/0019916 A1 | 2/2002 | Henrion | |
| 2002/0027908 A1 | 3/2002 | Kalkunte et al. | |
| 2002/0067695 A1 | 6/2002 | Skarpness et al. | |
| 2002/0176430 A1* | 11/2002 | Sangha | H04L 49/901 370/395.7 |
| 2002/0176432 A1 | 11/2002 | Courtney et al. | |
| 2003/0016697 A1 | 1/2003 | Jordan | |
| 2003/0043828 A1 | 3/2003 | Wang et al. | |
| 2003/0048792 A1 | 3/2003 | Xu et al. | |
| 2003/0065812 A1 | 4/2003 | Beier et al. | |
| 2003/0076849 A1 | 4/2003 | Morgan et al. | |
| 2003/0095560 A1 | 5/2003 | Arita et al. | |
| 2003/0117958 A1 | 6/2003 | Nation et al. | |
| 2003/0118016 A1 | 6/2003 | Kalkunte et al. | |
| 2003/0120894 A1 | 6/2003 | Wang et al. | |
| 2003/0123392 A1 | 7/2003 | Ruutu et al. | |
| 2003/0137939 A1 | 7/2003 | Dunning et al. | |
| 2003/0179765 A1* | 9/2003 | Goetzinger | H04L 47/10 370/428 |
| 2003/0198231 A1 | 10/2003 | Kalkunte et al. | |
| 2003/0198241 A1 | 10/2003 | Putcha et al. | |
| 2003/0200330 A1 | 10/2003 | Oelke et al. | |
| 2003/0217184 A1* | 11/2003 | Nair | H04L 49/9021 709/250 |
| 2003/0222860 A1 | 12/2003 | Yamaura | |
| 2003/0223435 A1 | 12/2003 | Gil | |
| 2004/0027989 A1 | 2/2004 | Martin et al. | |
| 2004/0037558 A1 | 2/2004 | Beshasi | |
| 2004/0066675 A1 | 4/2004 | He et al. | |
| 2004/0202169 A1 | 10/2004 | Mukouyama et al. | |
| 2005/0063370 A1 | 3/2005 | Beshai et al. | |
| 2005/0076138 A1 | 4/2005 | Sterne | |
| 2005/0125424 A1 | 6/2005 | Herriott et al. | |
| 2005/0129033 A1 | 6/2005 | Gordy et al. | |
| 2005/0135356 A1 | 6/2005 | Muthukrishnan et al. | |
| 2005/0223139 A1 | 10/2005 | Wagh et al. | |
| 2005/0259574 A1 | 11/2005 | Figueira et al. | |
| 2006/0034172 A1 | 2/2006 | Morton | |
| 2006/0092842 A1 | 5/2006 | Beukema et al. | |
| 2006/0095609 A1 | 5/2006 | Radhakrishnan et al. | |
| 2006/0155938 A1 | 7/2006 | Cummings et al. | |
| 2006/0182112 A1 | 8/2006 | Battle et al. | |
| 2006/0251109 A1* | 11/2006 | Muller | H04L 47/283 370/463 |
| 2007/0015525 A1 | 1/2007 | Beming et al. | |
| 2007/0019553 A1 | 1/2007 | Sagfors et al. | |
| 2007/0025242 A1 | 2/2007 | Tsang | |
| 2007/0053350 A1 | 3/2007 | Spink et al. | |
| 2007/0274215 A1 | 11/2007 | Gusat et al. | |
| 2007/0297453 A1* | 12/2007 | Niinomi | H04L 47/10 370/474 |
| 2008/0144670 A1 | 6/2008 | Gooossens et al. | |
| 2008/0259936 A1 | 10/2008 | Hussain et al. | |
| 2009/0003212 A1 | 1/2009 | Kwan et al. | |
| 2009/0010162 A1 | 1/2009 | Bergamasco et al. | |
| 2009/0161684 A1 | 6/2009 | Voruganti et al. | |
| 2009/0182944 A1 | 7/2009 | Comparan et al. | |
| 2010/0057953 A1 | 3/2010 | Kim et al. | |
| 2010/0088756 A1 | 4/2010 | Balakrishnan et al. | |
| 2010/0100670 A1 | 4/2010 | Jeddeloh | |
| 2010/0165842 A1 | 7/2010 | Wang et al. | |
| 2010/0325318 A1 | 12/2010 | Desoli et al. | |
| 2011/0058571 A1 | 3/2011 | Bloch et al. | |
| 2012/0072635 A1 | 3/2012 | Yoshida et al. | |
| 2012/0106562 A1 | 5/2012 | Laor et al. | |
| 2012/0144064 A1 | 6/2012 | Parker et al. | |
| 2013/0021354 A1* | 1/2013 | Van Eerd | G09G 5/399 345/531 |
| 2013/0212296 A1 | 8/2013 | Goel et al. | |
| 2014/0036930 A1 | 2/2014 | Lih et al. | |
| 2014/0095745 A1 | 4/2014 | Kawahara | |
| 2014/0140206 A1 | 5/2014 | Hendel et al. | |
| 2014/0155043 A1 | 6/2014 | Gell et al. | |
| 2014/0204742 A1 | 7/2014 | Pandit | |
| 2014/0269711 A1 | 9/2014 | Ravid et al. | |
| 2014/0286349 A1 | 9/2014 | Kitada | |
| 2014/0289568 A1 | 9/2014 | Koyoma et al. | |
| 2014/0310354 A1 | 10/2014 | Fountain et al. | |
| 2015/0026309 A1 | 1/2015 | Radcliffe et al. | |
| 2015/0058857 A1 | 2/2015 | Sandstorm | |
| 2015/0095568 A1 | 4/2015 | Lamb et al. | |
| 2015/0103667 A1 | 4/2015 | Elias | |
| 2015/0180790 A1 | 6/2015 | Rimmer et al. | |
| 2015/0371607 A1 | 12/2015 | Holland et al. | |
| 2016/0226951 A1 | 8/2016 | Talpey et al. | |
| 2018/0063030 A1 | 3/2018 | Mitulal et al. | |
| 2018/0115498 A1* | 4/2018 | Sundaram | H04L 47/39 |

(56) References Cited

U.S. PATENT DOCUMENTS

2019/0042443 A1* 2/2019 Maciejewski ....... G06F 12/0871
2019/0042513 A1* 2/2019 Fleming, Jr ........ G06F 9/30145
2019/0044874 A1* 2/2019 Zhang .................... H04L 47/12
2020/0177521 A1* 6/2020 Blumrich ............ H04L 49/3036

OTHER PUBLICATIONS

"QoS Modular Qos Command—Line Interface Configuration Guide, Cisco IOS Xe Fuji 16.8x," Cisco, pp. 1-25, Apr. 20, 2018, as downloaded from https://www.cisco.com/c/en/us/td/docs/ios-xml/ios/qos_mqc/configuration/xe-16-8/qos-mqc-xe-16-8-book/qos-limits-wred.html.

Infiniband Architecture Release 1.2.1, vol. 1, General specifications, Chapter 7.9, pp. 212-216, Nov. 2007.

Raatikainen, P., "ATM Switches—Switching Technology S38.3165", Switching Technology, L8-1, 34 pages, year 2006 (http://www.netlab.hut.fi/opetus/s383165).

Fahmy, S., "A Survey of ATM Switching Techniques", Department of Computer and Information Science, The Ohio State University, USA, pp. 1-22m Aug. 21, 1995 downloaded from http://www.cs.purdue.edu/homes/fahmy/cis788.08Q/atmswitch.html.

Minkenberg et al., "Multistage Interconnection Networks for Data Centers; Bidirectional Fat Tree Construction and Routing for IEEE 802.1au", IBM Research GmbH, Zurich, Switzerland, pp. 1-9, Jul. 2, 2007.

Bwalya et al., "Performance Evaluation of Buffer Size for Access Networks in First Generation Optical Networks", International Journal of Internet of Things, vol. 6, issue 3, pp. 98-105, year 2017.

U.S. Appl. No. 17/503,383 Office Action dated Nov. 4, 2022.

* cited by examiner

ZERO-COPY BUFFERING OF TRAFFIC OF LONG-HAUL LINKS

FIELD OF THE INVENTION

The present invention relates generally to communication networks, and particularly to methods and systems for buffering data of long-haul links.

BACKGROUND OF THE INVENTION

In some data communication networks, flow control management includes buffering of incoming traffic. Various buffering schemes in network devices are known in the art. For example, U.S. Patent Application Publication 2011/0058571 describes a communication apparatus that includes a plurality of switch ports, each including one or more port buffers for buffering data that traverses the switch port. A switch fabric is coupled to transfer the data between the switch ports. A switch control unit is configured to reassign at least one port buffer of a given switch port to buffer a part of the data that does not enter or exit the apparatus via the given switch port, and to cause the switch fabric to forward the part of the data to a destination switch port via the at least one reassigned port buffer.

As another example, U.S. Patent Application Publication 2013/0028256 describes a method for communication, in a network element that includes multiple ports. The method includes buffering data packets entering the network element via the ports in input buffers that are respectively associated with the ports. Storage of the data packets is shared among the input buffers by evaluating a condition related to the ports, and, when the condition is met, moving at least one data packet from a first input buffer of a first port to a second input buffer of a second port, different from the first port. The buffered data packets are forwarded to selected output ports among the multiple ports.

As yet another example, U.S. Pat. No. 9,325,641 describes a switching apparatus including multiple ports, each including a respective buffer, and a switch controller. The switch controller is configured to concatenate the buffers of at least an input port and an output port selected from among the multiple ports for buffering traffic of a long-haul link, which is connected to the input port and whose delay exceeds buffering capacity of the buffer of the input port alone, and to carry out end-to-end flow control for the long-haul link between the output port and the input port.

SUMMARY OF THE INVENTION

An embodiment of the present invention that is described herein provides a network device including multiple ports, multiple buffer slices, a controller, and buffer control circuitry. The multiple ports are configured to communicate packets over a network. The multiple buffer slices are linked respectively to the multiple ports. The controller is configured to allocate a group of two or more of the buffer slices to a selected port among the ports. The buffer control circuitry is configured to buffer the packets, communicated via the selected port, in the group of the buffer slices, using zero-copy buffering.

In some embodiments, the controller is configured to allocate the group of the buffer slices to the selected port depending on a Round-Trip Time (RTT) of the packets communicated via the selected port. In some embodiments, the controller is configured to modify a number of the buffer slices in the group in accordance with a defined criterion. In an example embodiment, the controller is configured to modify the number of the buffer slices in the group in response to a traffic pattern of the packets communicated via the selected port. In another embodiment, the controller is configured to modify the number of the buffer slices in the group in response to a request from an application that communicates the packets via the selected port.

In some embodiments, the buffer control circuitry is configured to buffer the packets using zero-copy buffering by maintaining at least (i) a read pointer specifying a first location, in the two or more buffer slices in the group, from which a next packet is to be read, and (ii) a write pointer specifying a second location, in the two or more buffer slices in the group, in which a next packet is to be written. In a disclosed embodiment, each of the first location and the second location is specified in terms of (i) an identifier of a buffer slice, and (ii) a position within the buffer slice. In another embodiment, the buffer control circuitry is configured to buffer the packets using zero-copy buffering by further specifying an order in which the two or more buffer slices in the group are concatenated.

In yet another embodiment, the controller is configured to allocate the buffer slices to the group in accordance with an allocation criterion that aims to reduce physical distances among the buffer slices in the group. In still another embodiment, the buffer control circuitry is configured to communicate flow-control messages via the selected port depending on a fill status of the buffer zones allocated to the selected port. In an example embodiment the flow-control messages include credit messages. In another embodiment the flow-control messages include pause-resume messages.

In some embodiments, the controller is configured to collect one or more performance metrics pertaining to the group. In some embodiments, the buffer control circuitry is configured to mitigate congestion in the selected port by discarding one or more of the packets buffered in the two or more buffer slices in the group.

There is additionally provided, in accordance with an embodiment of the present invention, a method including, in a network device that includes multiple ports and multiple buffer slices linked respectively to the multiple ports, allocating a group of two or more of the buffer slices to a selected port among the ports. The packets communicated via the selected port are buffered in the group of the buffer slices using zero-copy buffering.

There is further provided, in accordance with an embodiment of the present invention, a method including receiving and transmitting packets, over a network, using a network device that includes (i) multiple ports and (ii) multiple buffer slices linked to the ports. A selected port is designated to serve a long-haul link of the network. A group of multiple buffer slices is allocated to the selected port that serves the long-haul link. The packets arriving via the selected port are buffered in the group of the buffer slices, using a zero-copy buffering scheme that saves each packet only once on arrival.

The present invention will be more fully understood from the following detailed description of the embodiments thereof, taken together with the drawings in which:

DETAILED DESCRIPTION OF EMBODIMENTS

Overview

Figure 1:
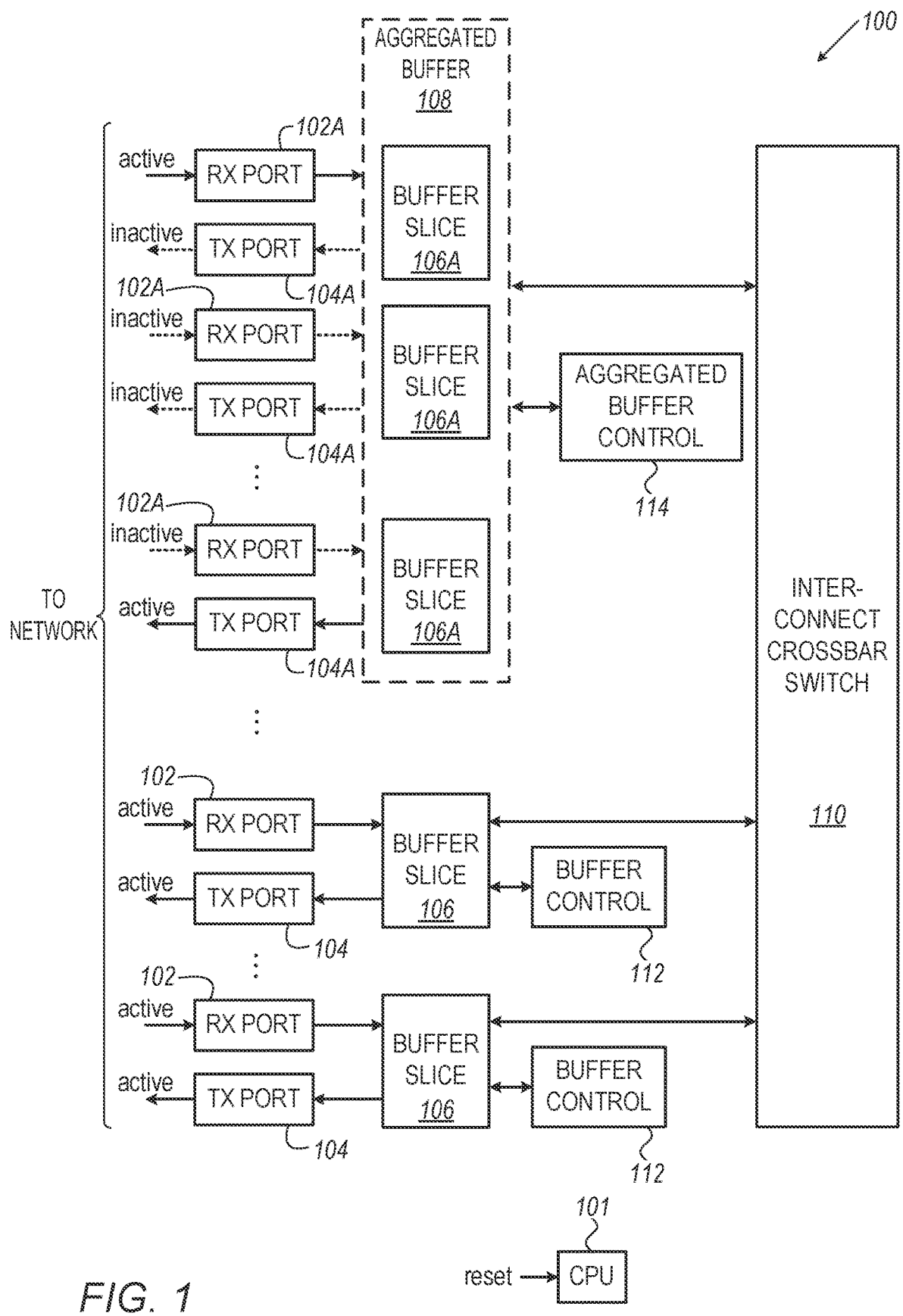
FIG. 1 is a block diagram that schematically illustrates the architecture of a network switch 100 that supports long-haul connections, in accordance with an embodiment of the present invention.

In some communication networks, devices that are connected to the network (e.g., switches, routers, hubs, bridges, gateways, Network Interface Controllers (NICs) and Host Channel Adapters (HCAs), collectively referred to hereinbelow as Network Devices (ND)), communicate with each other by sending signals (e.g., electrical, or optical signals) over network links that interconnect among the NDs. The signals may comprise data and control traffic, including flow control information. An ND may comprise multiple ports for receiving data from the network and for delivering data to the network.

An ND port connected to a network link may comprise a buffer to temporarily store incoming data. Since propagation delay of signals depends on the length of the network link, the size of the buffer should be typically larger for longer links. In some cases, however, it is desirable to connect a port to a long-haul link with long propagation delay, for which the required buffering is longer than the buffering capacity of the respective buffer.

When communicating over a link, the rate of data transmission at the sending end may be adapted so as not to overfill the buffer at the receiving end. For example, in lossless flow control, such as credit-based flow control, the receiving end or next hop switch signals the amount of free space available in its buffer. As another example, in pause-based (also lossless) flow control, the receiving end or next-hop switch signals when the occupancy of its buffer reaches a level higher or lower than certain respective high and low marking levels.

The propagation delay of communication signals along a given link is proportional to the length of the link. For example, the propagation time along a 1 KM optical fiber cable, in which light signals travel at a speed of about 2.108 meters per second, is about five microseconds. The minimum buffer size in a credit-based lossless communication protocol should therefore be larger than the amount of data that is present "on the wire"; assuming 100 Gbps, this amounts to 0.5 Mbit for the 1 KM wire.

In a pause-resume communication protocol, where a pause request is issued by the receiver and received by the transmitter, the minimum buffer size must be larger than twice the amount of data that is present in the wire (assuming symmetric communication delays and ignoring the response time of the transmitting node); for the 1 Km-100 Gbps example above, the minimum buffer size will be around 1 Mbit.

Embodiments of the present invention that are described herein provide improved methods and systems for data buffering in network devices that receive data over long-haul links. The disclosed techniques improve the flexibility and utilization of buffering resources in network devices.

In the disclosed techniques, an ND comprises multiple ports. In the present context, the term "input port" refers to a port that receives data from the network, and the term "output port" refers to a port that delivers data to the network. We further assume that at least one input port of the ND receives data over a long-haul link. Generally, the input (ingress) rate from a long-haul link may differ from the output (egress) rate to the long-haul link.

The network device further comprises a plurality of "buffer slices" that are used for buffering incoming packets that are received via the input ports. Typically, although not necessarily, the buffer slices are of equal size. Some of the buffer slices may be pre-allocated to respective input ports (and possibly located in proximity to the input ports). Other buffer slices may be managed flexibly as a shared buffer, without a-priori allocation to any specific port.

In an embodiment, the ND aggregates (e.g., during configuration) a group of buffer slices to support a long-haul connection that requires a total buffer size longer than the size of a single buffer slice. Such a group of buffer slices is referred to herein as a "long-haul group". When multiple long-haul links need to be supported, the ND may create multiple respective long-haul groups.

In some embodiments, the ND buffers the data received from the long-haul link in the buffer slices of the long-haul group using "zero-copy buffering." The term "zero-copy buffering" means that the ND does not move data from one buffer slice to another as additional data arrives from the link. Instead, the ND typically proceeds to buffer newly-arriving data in subsequent buffer slices assigned to the group. In other words, when using zero-copy buffering, each piece of received data is written to memory only once, on arrival. An example, pointer-based scheme for managing the zero-copy buffering is described below.

In some embodiments, in order to allocate a certain buffer slice to a long-haul group, the ND de-allocates the buffer slice from another port that the buffer slice was originally assigned to. In such a case, the original port is not used. In some embodiments, the ND controls each long-haul group separately and independently of other buffers and of other long-haul groups. In an example embodiment, the buffer slices that do not belong to any long-haul group are managed as a shared buffer, e.g., for use by input ports of non-long-haul links.

In some embodiments, at least some of the long-haul connections are lossless, and the controlling of the corresponding long-haul groups makes use of lossless protocols such as XON-XOFF and/or credit-based flow control (CBFC). In other embodiments, at least some of the long-haul connections are lossy, and the ND controls the corresponding aggregated-buffer groups using congestion mitigation techniques.

System Description

In lossless and, to some extent, in lossy communication systems, ingress packets are temporarily stored in buffers that are typically large enough to absorb data received over a time period that is proportional to the signal propagation delay between the sending node and the receiving node. Assuming, for example, signal propagation speed of 200, 000 KM/second and 1 KM wiring, the signal propagation delay amounts to 5 micro-second. If the bit rate is 100 Gbps, the amount of data bits that are present in the wire at any time is 500 Kbit.

In a credit-based communication protocol, when the transmitter runs out of transmission credits and stops transmitting, the input buffer of the receiving node should be large enough to absorb the data that is present in the wires at the time that the transmitting node stops transmitting (500 Kbit in the present example).

In a Pause-Resume communication discipline (also known as XON-XOFF), the receiving node, upon detecting that the input buffer occupancy has passed a preset threshold, requests that the sending node pauses the transmission. In this case, the minimum size of the receiving node input buffer more than doubles, as it now must absorb, in addition to the data that is present in the wiring from the transmitting node to the receiving node, also the data that the transmitting node continues to send while the pause request transverses from the receiving node to the transmitting node and until the transmitting node responds to the pause request. Assuming 1 micro-second response and symmetrical delays for both directions, the minimum buffer size for the current example is 1.1 Mbit.

In some communication systems, a network device may connect to peer network devices over communication links that vary in distance and, hence, may require different buffer sizes. Communication links over ranges of 1 KM or more are usually referred to as Long-Haul links (we will use below a different, more precise definition).

In some embodiments according to the present invention, a communication switch manages its input buffering resources as a large plurality of buffer slices. Some of the buffer slices may be coupled to the switch's communication ports. Other buffer slices may be managed as a shared buffer, on-demand. Typically, although not necessarily, the buffer slices are of equal size.

In various embodiments, any suitable number of buffer slices, of any suitable size, can be used. In one embodiment, the number of buffer slices is equal to the number of ports, with each buffer slice associated with a respective port. Alternatively, e.g., when some buffer slices are managed as a shared buffer, the number of buffer slices is larger than the number of ports. In one non-limiting example, the number of ports is 128, the number of buffer slices is also 128, and each buffer slice is 1 Mbyte in size. Alternatively, any other suitable numerical values can be used.

The storage capacity of a single buffer slice may be sufficient for most communication links, but may not be sufficient for long-haul links. In an embodiment, when the switch is configured to support one or more long-haul links, the switch allocates a group of two or more of the buffer slices for buffering the received packets of each long-haul link.

For a given long-haul link, the switch typically performs flow-control jointly over the entire long-haul group. For non-long-haul links, the switch may use buffer slices that are pre-assigned to the ports, and possibly allocate additional buffer slices from the shared buffer. The description that follows refers mainly to long-haul links and long-haul groups. Management of non-long-haul links, e.g., using a shared buffer, including flow-control of such links, may be implemented in any suitable way.

FIG. 1 is a block diagram that schematically illustrates the architecture of a network switch 100 that supports long-haul connections, in accordance with an embodiment of the present invention. (Although the example embodiment illustrated in FIG. 1 comprises a network switch, other network connected devices may be used in alternative embodiments, including but not limited to Network-Interface-Controllers (NICs), Host Channel Adapters (HCAs), network-connected graphic processor units (GPUs), routers, hubs, gateways, and any other device that is connected to a communication network.)

Switch 100 is configured to route communication packets to other network connected devices. The switch comprises a CPU 101 (sometimes referred to as a Controller hereinbelow), which is configured to control and monitor switch 100, and, responsively to a Reset input, to configure various switch circuits. Switch 100 further comprises Ingress Ports 102, Ingress Ports 102A, Egress Ports 104, and Egress Ports 104A. To temporarily store communication packets, switch 100 further comprises buffer slices 106 and buffer slices 106A.

Each buffer slice 106 is controlled by Buffer-Control circuit 112, which may comprise write and read buffers, congestion mitigation circuitry and/or flow-control circuitry such as XON/XOFF control or credit system. In some embodiments aggregated buffer control circuit 114 is configured to adaptively modify the buffer size, by adding unallocated buffer slices; or by exchanging buffer slices with other lossy-connection buffers, responsively to the congestions of the buffers.

According to the example embodiment illustrated in FIG. 1, a single buffer slice is coupled to each port-pair; however, the coupling is not hard-wired and, in embodiments, an aggregation of the buffer slices may be configured to serve one or more ports.

To transfer packets between ingress and egress ports, switch 100 further comprises an interconnect crossbar switch 110 that is configured to connect between buffer slices.

When switch 100 is deployed in a communication network and the number of network connections is smaller than the number of the switch's ports, some of the ports may not be active. In some embodiments, the switch may allocate buffer slices that are coupled to inactive ports to long-haul links. In the example embodiment illustrated in FIG. 1, a long-haul link is coupled to one of ingress ports 102A and to one of egress ports 104A (the connections that are marked "active"), whereas Rx ports 102 and Tx ports 104 are coupled through the network to non-long-haul links.

Upon switch configuration, CPU 101 creates an aggregated buffer 108, comprising buffer slices 106A, and configures an Aggregated Buffer Control 114 to control the aggregated buffer.

Buffer-Control circuitry 114 (sometimes referred to hereinbelow, for brevity, as "BCC") is configured to buffer packets using a plurality of buffer slices. In an embodiment the BCC comprises a two-level write-pointer, the first level specifying the buffer slice into which the next packet data should be written, and a second level specifying the write location within the specified buffer slice. Similarly, the BCC comprises a two-level read-pointer, the first level specifying the buffer slice from which the next packet data should be read, and a second level specifying the read location within the specified buffer slice. In some embodiments, the read and write pointers comprise data structures that include a buffer identifier, a buffer slice identifier and a pointer to a location within the buffer slice. The BCC may be configured to define the order in which the buffer slices are aggregated (e.g., concatenated) to form a long-haul group (also referred to herein as an "aggregated buffer").

In some embodiments, the BCC measures the status of the aggregated buffer (e.g., a fill status of the buffer). In an embodiment, the BCC may communicate flow-control messages through the port according to a fill status of the aggregated buffer allocated to the port; for example, the BCC may signal an XON when the unallocated buffer space is more than a first threshold, and an XOFF when the unallocated buffer space is less than a second threshold. In other embodiments, the BCC sends credit messages responsively to the fill status.

In other embodiments, the BCC is configured to mitigate congestion in a port by discarding ("dropping") one or more of the packets buffered in the aggregated buffer.

Thus, according to the example embodiment of FIG. 1, buffer slices that are coupled to unused switch ports may be aggregated to form a larger buffer, which is then allocated to a long-haul port. The switch controls the aggregated buffer similarly to controlling buffer slices that are coupled to non-long-haul links, including lossless flow control protocols such as XON-XOFF and credit-based flow control, and including lossy communication protocols with congestion mitigation.

As would be appreciated, switch 100 typically comprises additional circuitry that is not shown, such as one or more system buses, one or more packet classifiers, security circuitry, packet action tables and others; such circuitry, however, is not essential to the present invention, and, hence, omitted.

As would further be appreciated, the configuration of switch 100 illustrated in FIG. 1 is an example configuration that is depicted purely for the sake of conceptual clarity. Other suitable configurations may be used in alternative embodiments of the present invention. For example, CPU 101 may comprise multiple CPUs or may be external to the switch (coupled by a bus that is not shown). Multiple long-hauls connections may be supported. In some embodiments, Interconnect Crossbar Switch 110 may be distributed.

Switch Configuration Method

Figure 2:
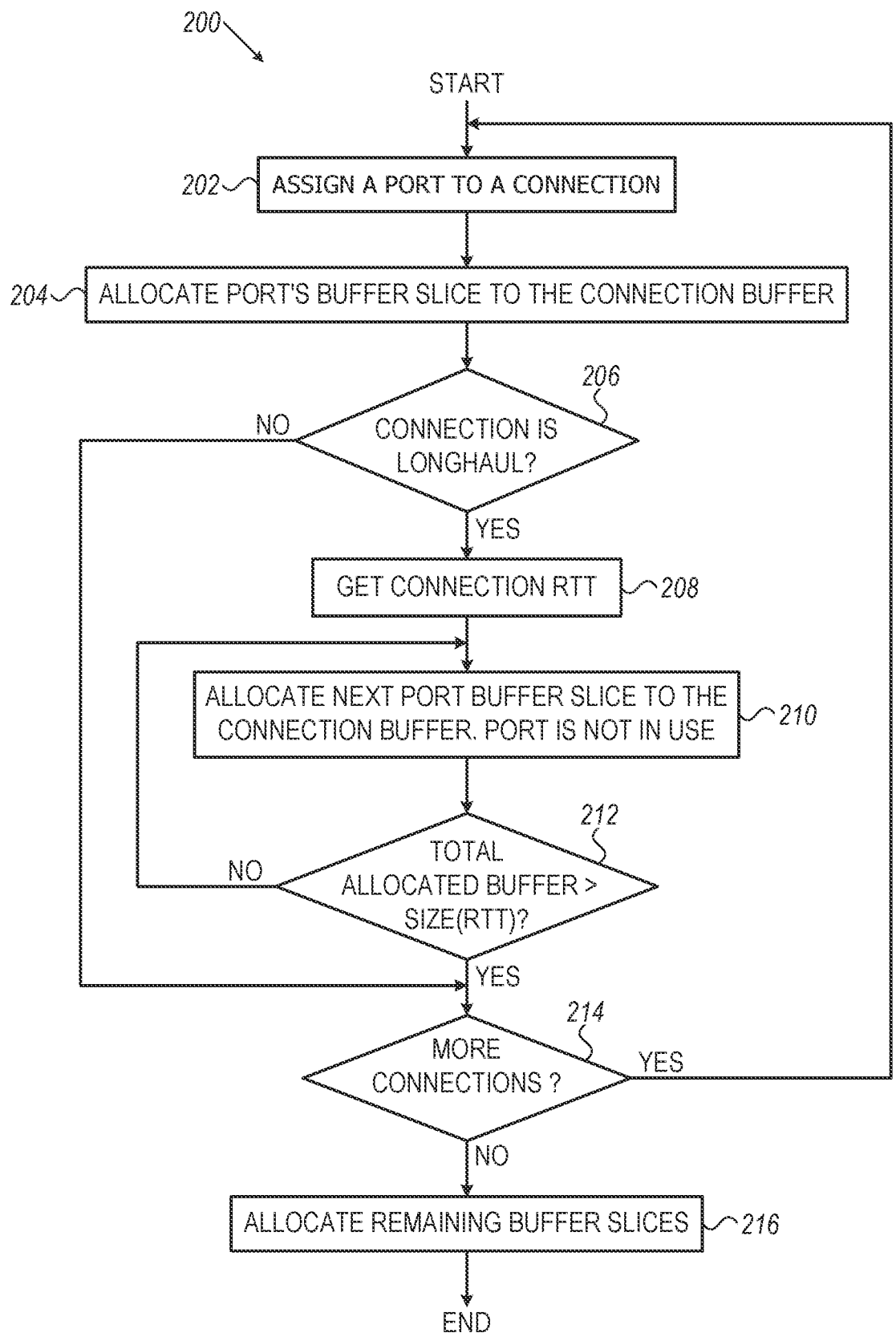
FIG. 2 is a flowchart that schematically illustrates a method for configuring connections of a switch in a mixed environment having long-haul and non-long-haul links, in accordance with an embodiment of the present invention.

FIG. 2 is a flowchart 200 that schematically illustrates a method for configuring connections of a switch in a mixed environment of long-haul and non-long-haul links, in accordance with an embodiment of the present invention. The flowchart is executed by a controller (e.g., CPU 101, FIG. 1), as part of the initialization program following a Reset input.

The flow starts at an Assign-Port step 202, wherein the controller configures a first connection by assigning a suitable port to the connection. In some embodiments the ports comprise identical circuitry, and the controller assigns a first port to the first connection. Next, at an Allocate-slice step 204, the controller allocates the buffer slice that is coupled to the assigned port to the connection. The controller then enters a Check-Long-Haul step 206, wherein the controller checks if the current connection is a long-haul connection. In some embodiments, the controller consults a list of long-haul connections that is prepared during switch initialization.

If, in step 206, the current connection is a long-haul, the controller enters a Get-RTT step 208, wherein the controller gets the RTT of the current connection. In some embodiments, the RTT values are preset; in other embodiments, the controller may measure the RTT, either in step 208 or as part of the switch initialization (for RTT measurement techniques, see, for example, U.S. Pat. No. 7,330,426).

Next, in an Allocate-Next-slice step 210, the controller allocates the buffer slice that is coupled to the next port to the current connection. Typically, this next port will not be used. The controller next enters a Check-Buffer-Size step 212 and checks if the accumulated buffer size for the current connection is large enough to support the connection. As explained above, the required buffer size may be determined responsively to the RTT. For example, the required buffer size may be equal to the bit rate multiplied by the RTT, plus a preset margin.

In various embodiments, the controller may use various allocation criteria to decide which buffer slices to allocate to the long-haul link. In an example embodiment, an allocation criterion aims to reduce (e.g., minimize) the physical distances between the buffer slices and the port of the long-haul link, or more generally the physical distances among the buffer slices in the long-haul group. This sort of criterion reduces buffering latency. Alternatively, any other suitable allocation criterion can be used.

If, in step 212 the accumulated buffer size is less than the required size, the controller reenters step 210, to allocate the buffer slice that is coupled to the next port. If the accumulated buffer size is large enough, the controller, in a Check-More-Connections step 214, checks if more connections should be configured, and, if so, reenters step 202.

If, in step 214, all the connections have been configured, the controller enters an Allocate-Remaining-buffer slices step 216, wherein the controller allocates the remaining buffer slices (if any). In some embodiments, the remaining buffer slices are allocated to connections proportionally to the size of the buffers already allocated to the connections. In other embodiments, allocation of further buffer slices may be done in accordance with a criterion that the user defines (e.g., a QOS specifications of the connections). After step 216 the flowchart ends.

As would be appreciated, the flowchart illustrated in FIG. 2 is an example flowchart that is cited by way of example. Flowcharts in accordance with the disclosed techniques are not limited to the description hereinabove. In alternative embodiments, for example, the controller may first prepare a list of buffer sizes for all the connections, and then allocate buffer slices and ports accordingly. In some embodiments, when a new connection is added, the switch does not execute flowchart 200 but, rather, execute an incremental configuration, wherein unused and/or redundant buffer slices are deallocated and then reallocated to the new connection. In an embodiment, the controller, at step 214, does not allocate all the remaining unallocated buffer slices; instead, the controller keeps some (or all) the non-allocated buffer slices for changes, and/or for the dynamic expansion of congested buffers. In embodiments, the controller may allocate additional buffer slices to a connection responsively to a traffic pattern; in another embodiment the controller may be configured to allocate additional buffer slices responsively to a requests from applications.

The configuration and flowchart described hereinabove and illustrated in FIGS. 1 and 2 are examples that are shown purely for the sake of conceptual clarity. Any other suitable configurations and flowcharts can be used in alternative embodiments. For example, switch 100 may be any network connected device, including but not limited to routers, hubs, bridges, gateways, NICs and HCAs. Each of switch 100, controller 101, buffer control circuit 112 and aggregated buffer control circuit 114 may be implemented using suitable hardware, such as in one or more Application-Specific Integrated Circuits (ASICs) or Field-Programmable Gate Arrays (FPGAs), using software, using hardware, or using a combination of hardware and software elements.

Controller 101 may comprise one or more general-purpose processors, which are programmed in software to carry out the functions described herein. The software may be downloaded to the processors in electronic form, over a network or from a host, for example, or it may, alternatively or additionally, be provided and/or stored on non-transitory tangible media, such as magnetic, optical, or electronic memory.

Although the embodiments described herein mainly address data buffering in communication systems, the methods and systems described herein can also be used in other applications.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. A network device, comprising:
   multiple ports, to communicate packets over a network;
   multiple buffer slices, linked respectively to the multiple ports;
   a controller, to allocate a concatenated group of two or more of the buffer slices to a selected port among the ports; and
   buffer control circuitry, to buffer the packets, communicated via the selected port, in the concatenated group of the buffer slices, using zero-copy buffering, the zero-copy buffering comprising:
      maintaining a read pointer and a write pointer, both pointing to the concatenated group of the buffer slices and indicating boundaries of a currently-used portion of the concatenated group;
      upon receiving a new packet for buffering in the concatenated group, writing the new packet to a location indicated by the write pointer; and
      upon receiving a request to read a packet from the concatenated group, reading the packet from a location indicated by the read pointer.

2. The network device according to claim 1, wherein the controller is to allocate the group of the buffer slices to the selected port depending on a Round-Trip Time (RTT) of the packets communicated via the selected port.

3. The network device according to claim 1, wherein the controller is to modify a number of the buffer slices in the group in accordance with a defined criterion.

4. The network device according to claim 3, wherein the controller is to modify the number of the buffer slices in the group in response to a traffic pattern of the packets communicated via the selected port.

5. The network device according to claim 3, wherein the controller is to modify the number of the buffer slices in the group in response to a request from an application that communicates the packets via the selected port.

6. The network device according to claim 1, wherein the location indicated by the write pointer and the location indicated by the read pointer are each specified in terms of (i) an identifier of a buffer slice, and (ii) a position within the buffer slice.

7. The network device according to claim 1, wherein the buffer control circuitry is to buffer the packets using zero-copy buffering by further specifying an order in which the two or more buffer slices in the group are concatenated.

8. The network device according to claim 1, wherein the controller is to allocate the buffer slices to the group in accordance with an allocation criterion that aims to reduce physical distances among the buffer slices in the group.

9. The network device according to claim 1, wherein the buffer control circuitry is to communicate flow-control messages via the selected port depending on a fill status of the buffer slices allocated to the selected port.

10. The network device according to claim 9, wherein the flow-control messages comprise credit messages.

11. The network device according to claim 9, wherein the flow-control messages comprise pause-resume messages.

12. The network device according to claim 1, wherein the controller is to collect one or more performance metrics pertaining to the group.

13. The network device according to claim 1, wherein the buffer control circuitry is to mitigate congestion in the selected port by discarding one or more of the packets buffered in the two or more buffer slices in the group.

14. The network device according to claim 1, wherein the zero-copy buffering comprises writing the new packet only once, upon arrival of the new packet in the network device.

15. A method, comprising:
   in a network device that includes multiple ports and multiple buffer slices linked respectively to the multiple ports, allocating a concatenated group of two or more of the buffer slices to a selected port among the ports; and
   buffering the packets communicated via the selected port, in the concatenated group of the buffer slices, using zero-copy buffering, the zero-copy buffering comprising:
      maintaining a read pointer and a write pointer, both pointing to the concatenated group of the buffer slices and indicating boundaries of a currently-used portion of the concatenated group;
      upon receiving a new packet for buffering in the concatenated group, writing the new packet to a location indicated by the write pointer; and
      upon receiving a request to read a packet from the concatenated group, reading the packet from a location indicated by the read pointer.

16. The method according to claim 15, wherein allocating the group comprises allocating the group of the buffer slices to the selected port depending on a Round-Trip Time (RTT) of the packets communicated via the selected port.

17. The method according to claim 15, wherein allocating the group comprises modifying a number of the buffer slices in the group in accordance with a defined criterion.

18. The method according to claim 17, wherein allocating the group comprises modifying the number of the buffer slices in the group in response to a traffic pattern of the packets communicated via the selected port.

19. The method according to claim 17, wherein allocating the group comprises modifying the number of the buffer slices in the group in response to a request from an application that communicates the packets via the selected port.

20. The method according to claim 15, and comprising specifying each of the location indicated by the write pointer and the location indicated by the read pointer in terms of (i) an identifier of a buffer slice, and (ii) a position within the buffer slice.

21. The method according to claim 15, wherein buffering the packets using zero-copy buffering further comprises specifying an order in which the two or more buffer slices in the group are concatenated.

22. The method according to claim 15, wherein allocating the group comprises allocating the buffer slices to the group in accordance with an allocation criterion that aims to reduce physical distances among the buffer slices in the group.

23. The method according to claim 15, wherein buffering the packets comprises communicating flow-control messages via the selected port depending on a fill status of the buffer slices allocated to the selected port.

24. The method according to claim 23, wherein the flow-control messages comprise credit messages.

25. The method according to claim 23, wherein the flow-control messages comprise pause-resume messages.

26. The method according to claim 15, and comprising collecting one or more performance metrics pertaining to the group.

27. The method according to claim 15, wherein buffering the packets comprises mitigating congestion in the selected port by discarding one or more of the packets buffered in the two or more buffer slices in the group.

28. The method according to claim 15, wherein the zero-copy buffering comprises writing the new packet only once, upon arrival of the new packet in the network device.

29. A method, comprising:
- receiving and transmitting packets, over a network, using a network device that includes (i) multiple ports and (ii) multiple buffer slices linked to the ports;
- designating a selected port to serve a long-haul link of the network;
- allocating a concatenated group of multiple buffer slices to the selected port that serves the long-haul link; and
- buffering the packets arriving via the selected port, in the concatenated group of the buffer slices, using a zero-copy buffering scheme that saves each packet only once on arrival, the zero-copy buffering scheme comprising:
  - maintaining a read pointer and a write pointer, both pointing to the concatenated group of the buffer slices and indicating boundaries of a currently-used portion of the concatenated group;
  - upon receiving a new packet for buffering in the concatenated group, writing the new packet to a location indicated by the write pointer; and
  - upon receiving a request to read a packet from the concatenated group, reading the packet from a location indicated by the read pointer.

* * * * *